United States Patent
Itoi

(10) Patent No.: US 6,515,439 B2
(45) Date of Patent: Feb. 4, 2003

(54) VERTICAL DEFLECTION DRIVING CIRCUIT

(75) Inventor: Nobuo Itoi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/032,343

(22) Filed: Dec. 21, 2001

(65) Prior Publication Data

US 2002/0105292 A1 Aug. 8, 2002

(30) Foreign Application Priority Data

Dec. 25, 2000 (JP) .......................... 2000-392148

(51) Int. Cl.[7] .............................. H01J 29/72; H04N 5/21
(52) U.S. Cl. ..................... 315/393; 315/364; 315/370
(58) Field of Search ...................... 315/364, 368, 315/371, 393, 399, 408, 410, 387, 395, 370, 368.17

(56) References Cited

U.S. PATENT DOCUMENTS 4,338,549 A * 7/1982 Haferl .......................... 315/393
4,999,549 A * 3/1991 Wilber ......................... 315/387
5,475,286 A * 12/1995 Jackson et al. .............. 315/371
5,929,574 A * 7/1999 Kim et al. .................... 315/370

* cited by examiner

*Primary Examiner*—Don Wong
*Assistant Examiner*—Chuc Tran
(74) *Attorney, Agent, or Firm*—Fish & Richardson P.C.

(57) ABSTRACT

Circuit means absorbing counter-electromotive voltage generated by a vertical deflection yoke coil DY while scanning period is provided in a vertical deflection driving circuit of PWM method. Because a MOS transistor TR4 for pumping-up switching is on while scanning period Tt', current flows through a channel: a diode D3 connected between source and drain of a MOS transistor TR1 for driving, a capacitor C3 for pumping-up, TR4, and a ground line (GND line) so that counter-electromotive voltage Va of power source side is absorbed. On the other hand, it is possible to detect retracing period Tr' and to make a pumping-up circuit on by providing the comparators 23 and 24 for pumping-up.

5 Claims, 4 Drawing Sheets

(A) Voltage Waveform of Point C (B) Voltage Waveform of Point C

VERTICAL DEFLECTION DRIVING CIRCUIT

BACKGROUND OF THE INVENTION

1. Field of the Invention

The present invention relates to a vertical deflection driving circuit applicable for a television receiver and various kinds of display instruments.

2. Description of the Related Art

A vertical deflection driving circuit according to the conventional example is shown in FIG. 3. Sawtooth waveform voltage Vsaw for vertical deflection applied to an input terminal 1 is supplied to inversion input terminal (−) of a differential amplifier circuit 2 through a resistor R0. To non-inversion input terminal (+) of the differential amplifier circuit 2, reference voltage Vref is supplied.

A capacitor C3 for pumping-up and a diode D1 construct a pumping-up circuit. While scanning period, a terminal X of the capacitor C3 for pumping-up is charged to power source voltage Vcc through the diode D1 by switching a switch SW to a terminal 3 side. On the other hand, while retracing period, the terminal X of the capacitor C3 for pumping-up becomes 2Vcc owing to capacitor coupling by switching the switch SW to a terminal 4 side. Here, forward threshold voltage Vf of the diode D1 is neglected. Voltage of the terminal X being output of the pumping-up circuit is supplied as power source voltage of the differential amplifier circuit 2.

Then, output of the differential amplifier circuit 2 is supplied to one terminal of a vertical deflection yoke coil DY. The other terminal of vertical deflection yoke coil DY is grounded through series circuit consisting of a capacitor C1 and a resistor R1. Voltage of connecting point B between the capacitor C1 and the resistor R1 is fed back to the inversion-input terminal (−) of the differential amplifier circuit 2 through a resistor R2. An integrating circuit consisting of resistors R3 and R4 and a capacitor C2 carries out S-correction by integrating voltage of the other terminal of the vertical deflection yoke coil DY, and the voltage being carried out the S-correction is fed back to the inversion-input terminal (−) of the differential amplifier circuit 2.

Waveforms at each main point of the vertical deflection driving circuit of the above-mentioned construction are shown in FIG. 4. In FIG. 4(A), deflecting current i at point A in FIG. 3 is shown. Current changes largely at boundary of retracing 20 period Tr and scanning terminal Tt. By the large change of current, counter-electromotive force generates at the vertical deflection yoke coil DY.

By detecting that voltage generating at this time is higher than reference voltage Vref (usually equal to power source voltage Vcc supplied to the vertical deflection driving circuit) and switching the above-mentioned switch SW, the pumping-up circuit is made on and the driving voltage is made 2Vcc only while retracing period.

Thus, the driving voltage at point A in FIG. 3 is 2 Vcc as showing in FIG. 4(B). In FIG. 4(C), voltage waveform (i×R1) at point B in FIG. 3 is shown. The voltage is fed back to the inversion-input terminal (−) of the differential amplifier circuit 2 through the resistor 2.

Now, a vertical deflection driving circuit of PWM method as shown in FIG. 5 is known. This method is fundamentally a circuit where Pulse Width Modulation is carried out to input sawtooth waveform voltage and further the voltage is restored to its original sawtooth waveform through a filter 14 consisting of a coil L and a capacitor C. In FIG. 5, sawtooth voltage Vsaw for vertical deflection is supplied to non-inversion input terminal (+) of a comparator 10 from an input terminal 11.

On the other hand, sawtooth wave of the designated frequency f is supplied to an inversion-input terminal (−) of the comparator from an input terminal 12 as a carrier signal. Then, to output 13 of the comparator 10, a PWM signal having pulse width according to level of input sawtooth voltage Vsaw is obtained as shown in FIG. 6. The PWM signal is restored to waveform of input sawtooth wave by the filter 14 (low-pass filter) consisting of the coil L and the capacitor C.

As described above, in the conventional vertical deflection driving circuit, retracing period is detected by counter-electromotive force generating at the vertical deflection yoke coil DY and vertical deflection driving is carried out by making the pumping-up circuit on.

However, when the vertical deflection yoke coil L is driven by the above-mentioned vertical deflection driving circuit of PWM method, counter-electromotive voltage Va of the power source Vcc 1 side and counter-electromotive voltage Vb of the ground GND side generate at each pulse as shown in FIG. 6. Here, FIG. 6(A) shows a waveform of a carrier signal and FIG. 6(B) shows a waveform of a PWM signal.

Because of that, there is a problem that malfunction occurs in the pumping-up circuit and stable vertical deflection driving can not be carried out in the method that retracing period is detected by counter-electromotive force generating at the vertical deflection yoke coil DY and the pumping-up circuit is made on as the conventional circuit.

SUMMARY OF THE INVENTION

Then, an object of the invention is to prevent malfunction of the pumping-up circuit and to enable to drive vertical deflection stably by removing influence of counter-electromotive voltage while scanning period in the vertical deflection driving circuit of PWM method.

Further another object is to provide a circuit detecting retracing period stably and operating the pumping-up circuit instead of conventional method detecting retracing period by counter-electromotive force.

Then, the invention is a vertical deflection driving circuit characterized in having a pre-amplifier receiving sawtooth waveform voltage for vertical deflection, a first comparator pulse-width-modulating output signal of said pre-amplifier by comparing a predetermined carrier signal and output signal of said pre-amplifier, a transistor circuit for driving supplied with output signal of the first comparator, a pumping-up circuit pumping-up power source voltage supplied to said transistor circuit for driving while retracing period, and a vertical deflection yoke coil supplied with output signal of said transistor circuit for driving, and a voltage absorbing circuit absorbing counter-electromotive voltage generating from said vertical deflection yoke coil while scanning period is provided.

According to the construction, it is possible to prevent malfunction of the pumping-up circuit and to carry out stable vertical deflection driving.

The voltage absorbing circuit comprising a diode connected between source and drain of said transistor circuit for driving, a capacitor for pumping-up of said pumping-up circuit, and a transistor for pumping-up switching in which drain thereof is connected to one end of said capacitor for pumping-up, source thereof is grounded, and for charging said capacitor for pumping-up making the transistor on while said scanning period, and said counter-electromotive voltage is absorbed to a ground line through said diode, said capacitor for pumping-up, and said transistor for pumping-up switching.

According to the construction, as the circuit is constructed so as to absorb counter-electromotive voltage generated by the vertical deflection yoke coil using the capacitor for pumping-up and the transistor for pumping-up while scanning period, it is possible to depress increase numbers of circuit elements to the most.

Further adding the above-mentioned construction, a second comparator comparing output signal of said pre-amplifier and reference voltage to detect retracing periods and outputting detecting signal and a pumping-up switching circuit operating said pumping-up circuit responding on detecting signal of said second comparator are provided in the circuit. According to this, it is possible to detect retracing period and to operate the pumping-up circuit without using counter-electromotive generated by the vertical deflection yoke coil.

DESCRIPTION OF THE PREFERRED EMBODIMENTS

Figure 1:
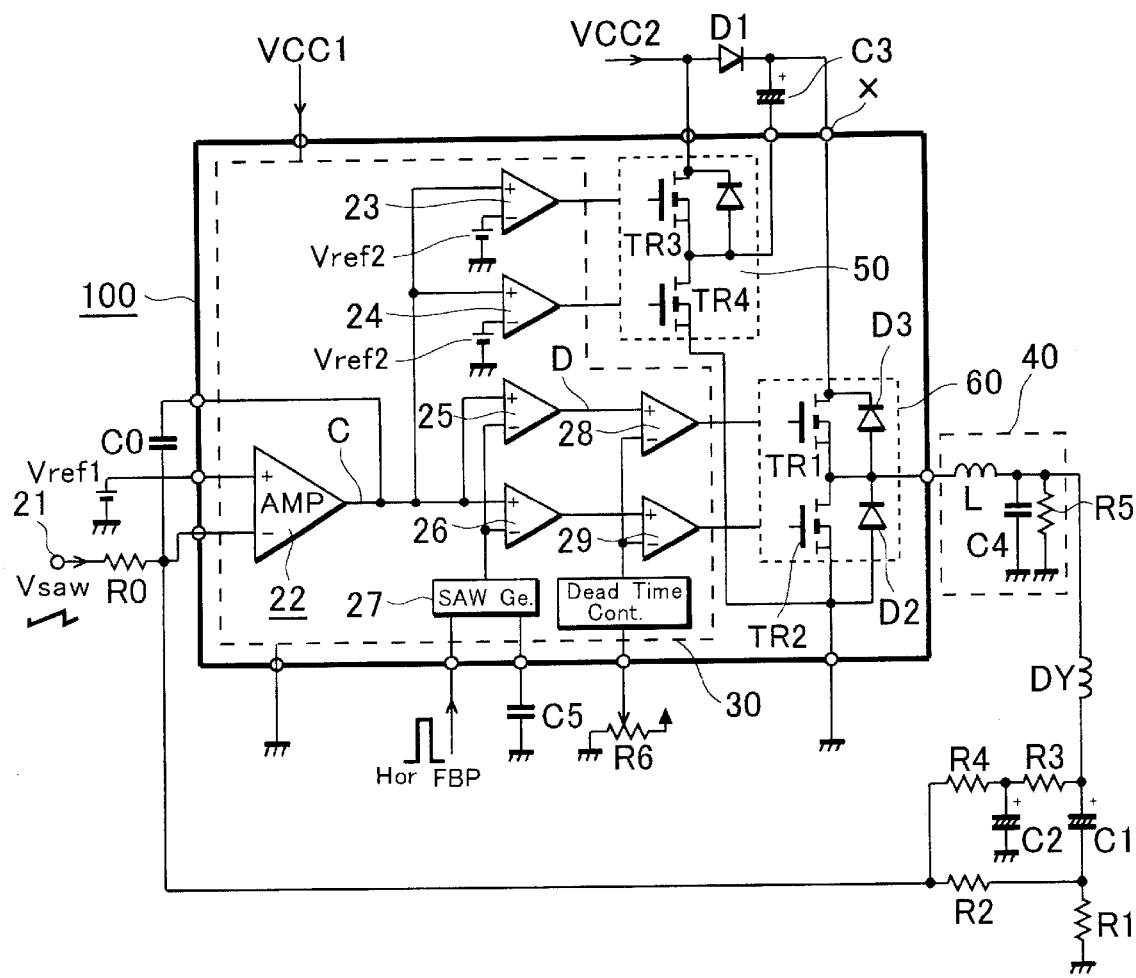
FIG. 1 is a circuit diagram of a vertical deflection driving circuit according to a mode for carrying out the invention.
Figure 3:
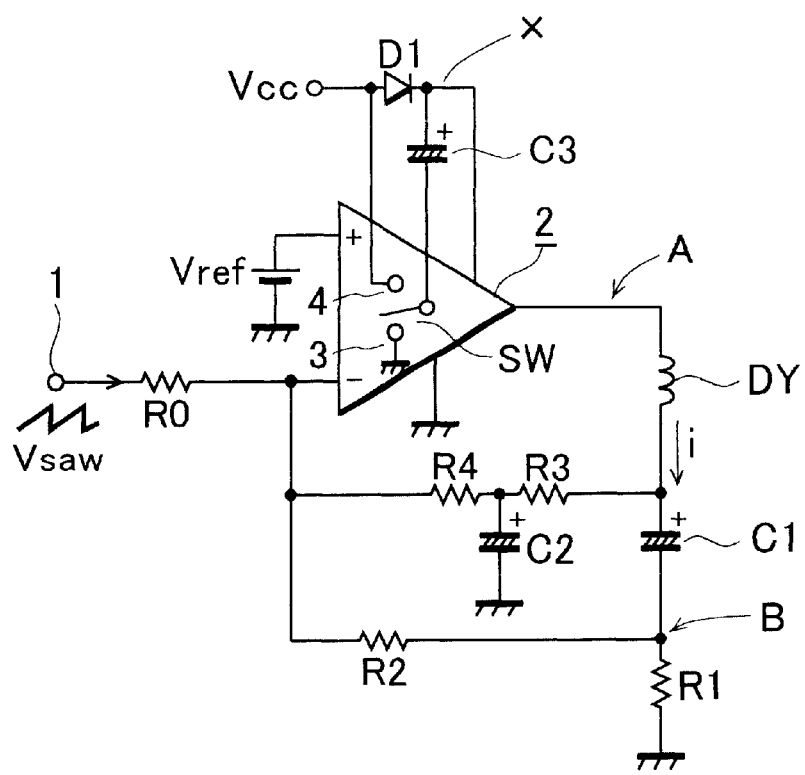
FIG. 3 is a circuit diagram of a vertical deflecting driving circuit according to the conventional example.
Figure 4:
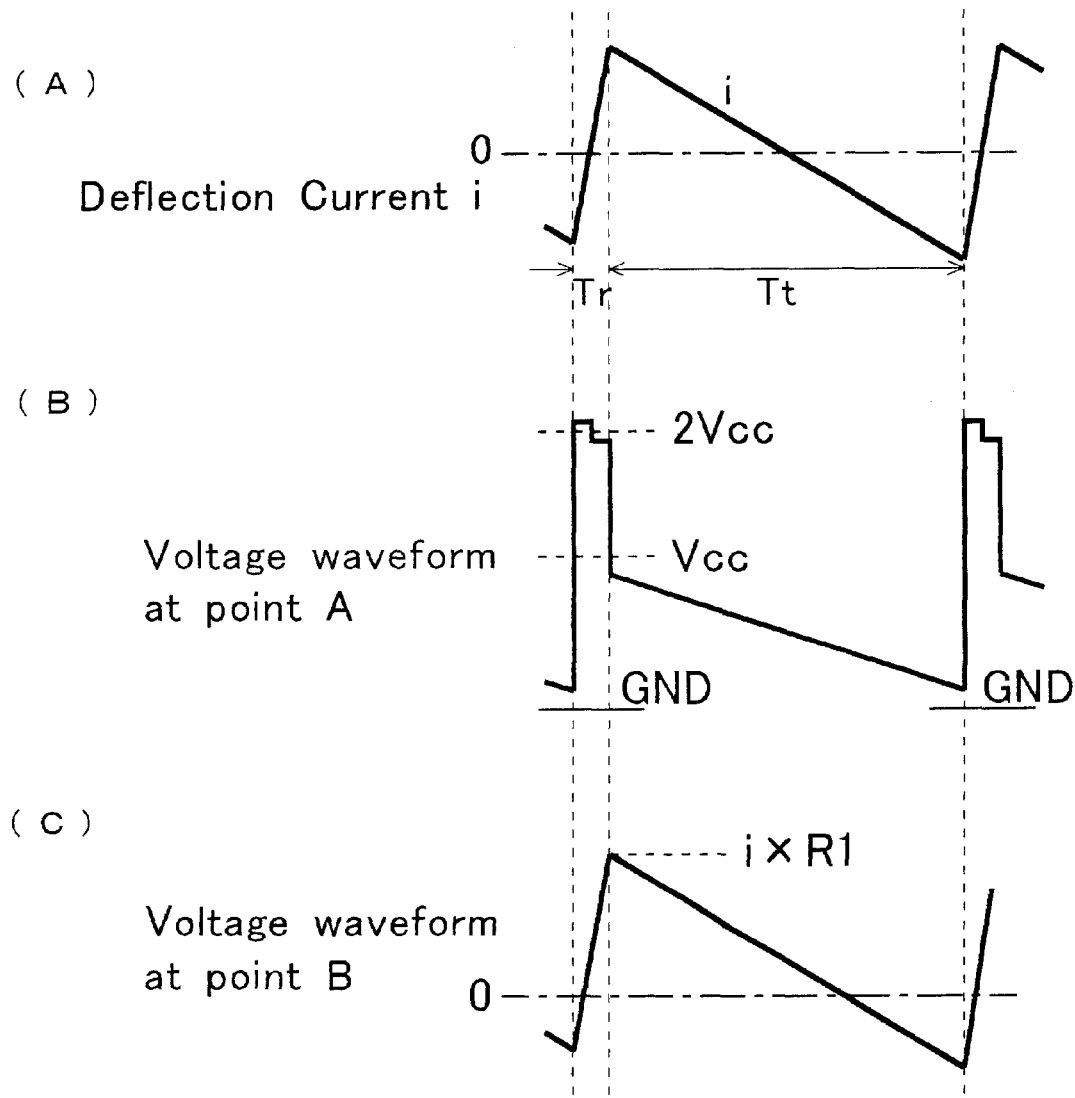
FIG. 4 is an operation waveform chart of the vertical deflection driving circuit according to the conventional example.
Figure 5:
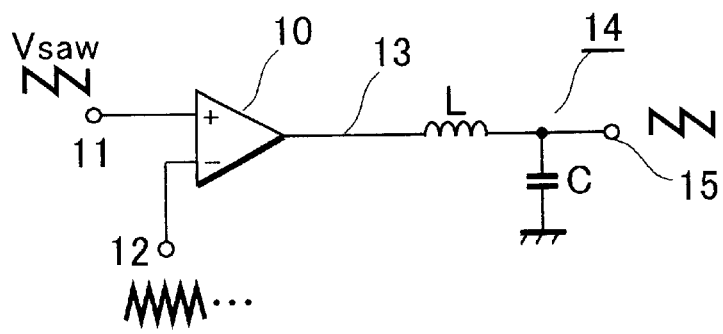
FIG. 5 is an outline of circuit diagram showing a vertical deflection circuit of PWM method.
Figure 6A:
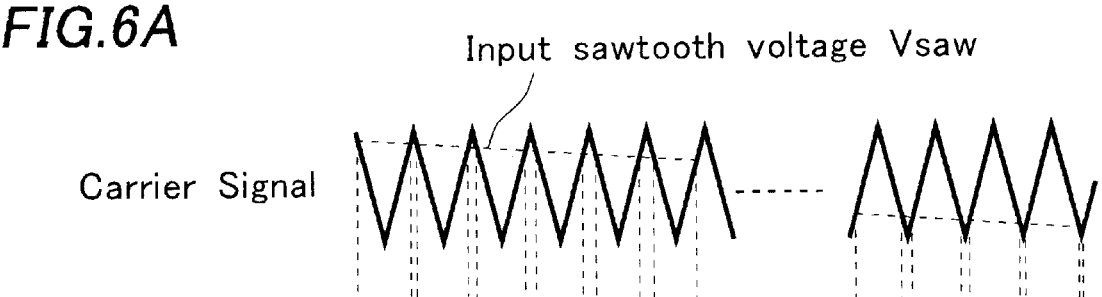
FIG. 6 is an operation waveform chart of the vertical deflection circuit of PWM method.
Figure 6B:
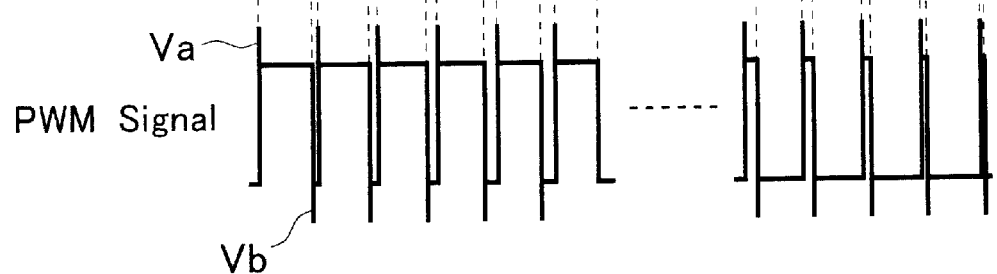

Next, a mode for carrying out the invention will be described referring to figures. A circuit diagram of a vertical deflection driving circuit of PWM method according to the invention is shown in FIG. 1. The same composing parts as FIG. 3 are given the same symbols, and an explanation for each of them is omitted.

A part surrounded with a thick line shows composing parts built in a semiconductor integrated circuit 100 and other composing parts show exterior parts.

Sawtooth voltage Vsaw for vertical deflection applied to an input terminal 21 is supplied to an inversion terminal (−) of a differential amplifier circuit 22 (pre-amplifier) through a resistor R0. Reference voltage Vref1 is supplied to non-inversion terminal (+) of the differential amplifier circuit 22. Output of the differential amplifier circuit 22 is fed back to the inversion-input terminal (−) through a capacitor C0. Output of the differential amplifier circuit 22 is supplied to inversion-input terminals (−) of comparators 23 and 24 (second comparator) for pumping-up.

Figure 2:
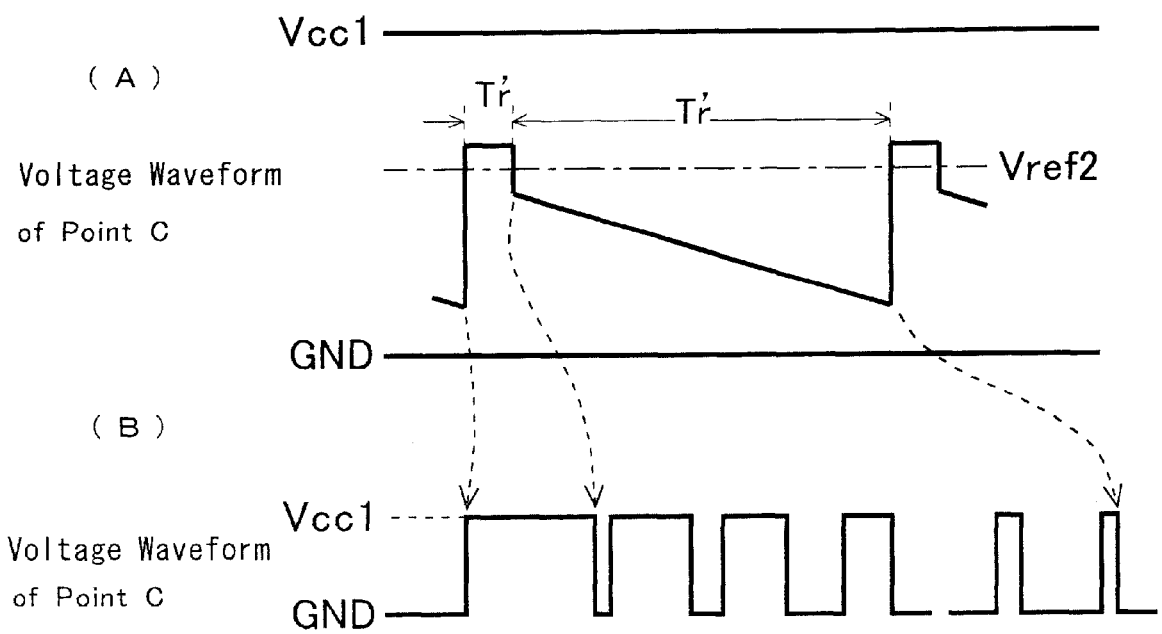
FIG. 2 is an operation waveform chart of the vertical deflection driving circuit according to the mode for carrying out the invention.

Output waveform (voltage waveform at point C in the figure) of the differential amplifier circuit 22 is shown in FIG. 2(A). That is, output of the differential amplifier circuit 22 is higher while retracing period Tr' comparing with while scanning period Tt'. Therefore, by setting reference voltage Vref2 supplied to non-inversion input terminal (+) of the comparators 23 and 24 for pumping-up to level cutting retracing period Tr' out as FIG. 2(A), it is possible to detect retracing period Tr'.

The two comparators 23 and 24 for pumping-up are provided in order to correspond to MOS transistors TR3 and TR4 for pumping-up switching described later.

Outputs of the comparators 23 and 24 for pumping-up are supplied to a pumping-up switching circuit 50. The pumping-up switching circuit 50 includes a level shift circuit (not shown) boosting output voltage level of the comparators 23 and 24 for pumping-up, and the level-shifted voltage is supplied to gates of the MOS transistors TR3 and TR4 for pumping-up switching.

The MOS transistors TR3 and TR4 for pumping-up switching are connected between power source voltage Vcc2 (25 V for example) and ground voltage (0 V). Thus, TR3 is on and TR4 is off while retracing period Tr', and while scanning period Tt', reversely TR 3 is off and TR 4 is on.

In the mode for carrying out, TR3 is P channel type and TR4 is N channel type. However, both of TR3 and TR4 may be N channel types. As TR3 and TR4 function as switches, they may be constructed with bipolar transistors though characteristics are worse.

Thus, the terminal X of the capacitor C3 is charged to power source voltage Vcc2 through the diode D1 while scanning period Tt' in the pumping-up circuit consisting of the capacitor C3 for pumping-up and the diode D1. On the other hand, the terminal X of the capacitor C3 for pumping-up becomes 2 Vcc2 by capacitor coupling effect while retracing period Tr'. The capacitor C3 and the diode D1 are exterior parts of the IC.

Output of the differential amplifier circuit 22 is input to non-inversion input terminals (+) of comparators 25 and 26 (first comparator). To inversion-input (−) of the comparators 25 and 26, output of a sawtooth wave generating circuit 27 is supplied as a carrier signal. Although the carrier signal of the sawtooth wave generating circuit 27 is formed synchronizing horizontal flyback pulse FBP for example, frequency thereof may be double, three times, and so on of horizontal frequency. The signal is needless to be synchronizing signal for use as a carrier signal.

Thus, the comparators 25 and 26 carry out pulse width modulation to output signal of the differential amplifier circuit 22 as shown in FIG. 2(B). The two comparators 25 and 26 are provided in order to correspond with MOS transistors TR1 and TR2 for driving described later.

Output pulses of the comparators 25 and 26 are supplied to comparators 28 and 29 of the next stage. Symbol 30 is a dead time control circuit and supplies reference voltage for dead time control to the comparators 28 and 29.

Outputs of the comparators 28 and 29 are supplied to an output circuit 60. The output circuit 60 includes a level shift circuit (not shown) boosting output voltage level of the comparators 28 and 29, and the level-shifted voltage is supplied to gates of MOS transistors TR1 and TR2 for driving. The MOS transistors TR1 and TR2 for driving are connected between power source voltage Vcc2 (25 V for example) and ground voltage (0 V).

Here, although TR1 is P channel type and TR2 is N channel type, both may be constructed with bipolar transistors.

Although the output circuit 60 consisting of the MOS transistors TR1 and TR2 for driving outputs pulse waveform similar as output waveform of the comparators 28 and 29, the voltage amplitude is level-inverted to power source voltage Vcc2 (25 V) from power source voltage Vcc1 (9 V).

Then, output of the output circuit 60 consisting of the MOS transistors TR1 and TR2 for driving is supplied to a vertical deflection yoke coil DY after high frequency component is attenuated enough through a filter circuit 40 (low pass filter) consisting of a coil 4, a capacitor C4, and a resistor R5, so vertical deflection driving is carried out.

Although counter-electromotive power generates by the vertical deflection yoke coil DY as before-mentioned in the above-mentioned vertical deflection driving circuit of PWM method, the counter-electromotive power is absorbed to a ground line (GND line) by the following construction. First, about counter-electromotive voltage Vb of ground side, a diode D2 connected between source and drain of the MOS transistor TR2 for driving operates so as to be absorbed (cramped) to the ground line.

On the other hand, because the MOS transistor TR4 for pumping-up switching is on while scanning period Tt', current flows through a channel: the diode D3 connected between source and drain of the MOS transistor TR1 for driving, the capacitor C3 for pumping-up, TR4, and the ground line (GND line) so that counter-electromotive voltage Va of power source side is absorbed (cramped).

Thus, stable vertical deflection driving is possible while scanning period Tt' by that counter-electromotive voltage Va of power source side is absorbed and removed. On the other hand, detecting retracing period Tr' using counter-electromotive voltage Va becomes impossible as the result that counter-electromotive voltage Va of power source side is absorbed and removed. Therefore, there is not any problem because it is possible to detect retracing period Tr' and to operate the pumping-up circuit based on the detecting by providing the comparators 23 and 24 for pumping-up as above-mentioned.

According to the vertical deflection driving circuit of the invention, malfunction of the pumping-up circuit is prevented and stable vertical deflection driving becomes possible as a voltage absorbing circuit absorbing counter-electromotive voltage generating while scanning period by vertical deflection yoke means.

As the circuit is constructed so as to absorb counter electromotive voltage generated by vertical deflection yoke coil using the transistor for pumping-up made on while scanning period, it is possible to depress increase of numbers of circuit elements to the utmost. It is possible to detect retracing period without using counter-electromotive voltage generated by vertical deflection yoke coil and to operate the pumping-up circuit base on the detection.

What is claimed is:

1. A vertical deflection driving circuit having: a pre-amplifier receiving sawtooth waveform voltage for vertical deflection; a first comparator pulse-width-modulating output signal of said pre-amplifier by comparing a predetermined carrier signal and output signal of said pre-amplifier; a transistor circuit for driving supplied with output signal of the first comparator; a pumping-up circuit pumping-up power source voltage supplied to said transistor circuit for driving while retracing period; and a vertical deflection yoke coil supplied with output signal of said transistor circuit for driving, wherein a voltage absorbing circuit absorbing counter-electromotive voltage generating from said vertical deflection yoke coil while scanning period is provided.

2. A vertical deflection driving circuit according to claim 1, wherein said voltage absorbing circuit comprising: a diode connected between source and drain of said transistor circuit for driving; a capacitor for pumping-up of said pumping-up circuit; and a transistor for pumping-up switching in which drain thereof is connected to one end of said capacitor for pumping-up, source thereof is grounded, and for charging said capacitor for pumping-up making the transistor on while said scanning period, and wherein said counter-electromotive voltage is absorbed to a ground line through said diode, said capacitor for pumping-up, and said transistor for pumping-up switching.

3. A vertical deflection driving circuit according to claim 2, characterized by that said pumping-up circuit includes a diode supplied with power source voltage and a capacitor for pumping-up capacitor.

4. A vertical deflection driving circuit according to claim 1, characterized by that said transistor for driving includes a pair of output MOS transistors.

5. A vertical deflection driving circuit according to claim 1, characterized in providing: a second comparator comparing output signal of said pre-amplifier and reference voltage to detect retracing periods and outputting detecting signal; and a pumping-up switching circuit making said pumping-up circuit operate responding on detecting signal of said second comparator.

* * * * *